United States Patent
Hayashi et al.

[11] Patent Number: 6,094,976
[45] Date of Patent: Aug. 1, 2000

[54] METHOD OF SPECIFYING AND DIAGNOSING ABNORMALITIES IN PARTIALLY-CONNECTED CLUTCH STROKE LEVELS

[75] Inventors: Masahiko Hayashi; Junichi Imai, both of Fujisawa; Kazuhiko Kobayashi; Hiroyuki Arai, both of Kawasaki, all of Japan

[73] Assignees: Isuzu Motors Limited, Tokyo; Transtron, Inc., Kanagawa, both of Japan

[21] Appl. No.: 09/260,572

[22] Filed: Mar. 1, 1999

[30] Foreign Application Priority Data

Feb. 27, 1998 [JP] Japan .................................. 10-048396

[51] Int. Cl.⁷ .................................................. G01M 15/00
[52] U.S. Cl. .......................................................... 73/118.1
[58] Field of Search ...................... 73/1.79, 1.81, 73/118.1; 192/30 W, 3.51; 701/67, 68

[56] References Cited

U.S. PATENT DOCUMENTS 5,782,710  7/1998  Kosik et al. ............................... 701/67
5,902,344  5/1999  Eike et al. ................................. 701/67

*Primary Examiner*—Robert Raevis
*Attorney, Agent, or Firm*—Rader, Fishman & Grauer PLLC

[57] ABSTRACT

A method for automatic control of a friction clutch (1) in a vehicle, which clutch is designed to be disengaged and engaged by a clutch actuator (3) under automatic control. An initial partially engaged clutch stroke position (Q1) and an initial clutch stroke position (P1) at which fluid pressure in the clutch actuator reaches a prescribed value are detected to obtain a difference (R1) between said two clutch stroke positions prior to initiation of automatic clutch control. The friction clutch wears as it is used. Therefore, both of the partially engaged clutch stroke position and the clutch stroke position attaining the prescribed fluid pressure value change while the automatic clutch engagement/disengagement control is being performed. However, the difference between these two clutch stroke positions does not change. A current clutch stroke position attaining the predetermined fluid pressure is only detected during the automatic clutch control, and a current partially engaged clutch stroke position (Q2) is determined by adding the difference (R1) to the detected clutch stroke position (P2).

10 Claims, 2 Drawing Sheets

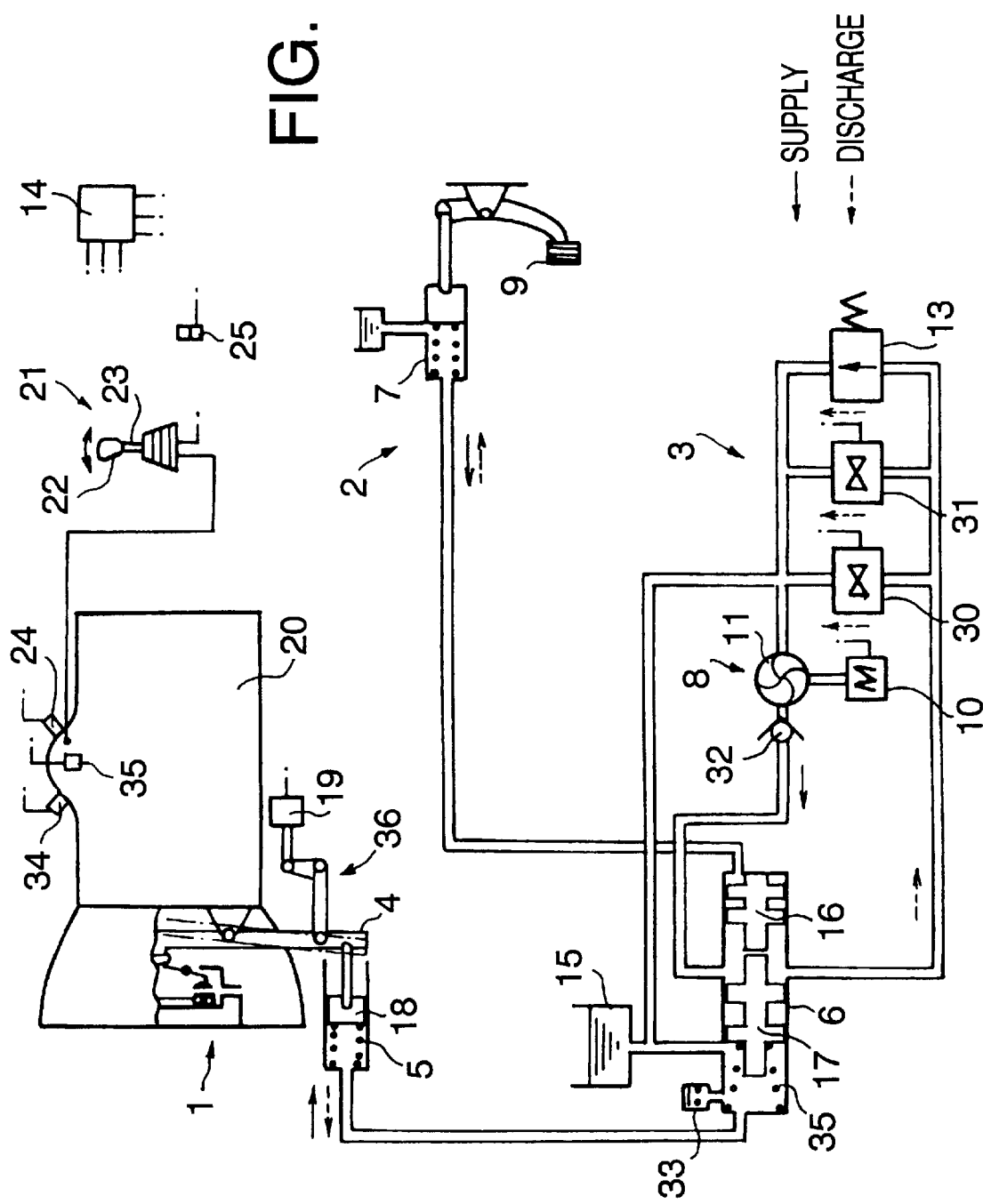

METHOD OF SPECIFYING AND DIAGNOSING ABNORMALITIES IN PARTIALLY-CONNECTED CLUTCH STROKE LEVELS

BACKGROUND OF THE INVENTION

1. Field of the Invention

The present invention relates to a method of specifying a partially engaged clutch stroke position for a vehicle fitted with an automatic clutch or the like and further relates to a method of diagnosing abnormalities in determination of the partially engaged clutch stroke position.

2. Description of the Related Art

In conventional vehicles with automatic clutch, an actuator is combined with a friction clutch, allowing the clutch to engage and disengage automatically.

In the engaging process of a friction clutch by automatic control, a disengaged clutch plate is first moved towards an engine flywheel rapidly while varying a clutch stroke position until a clutch face meets a flywheel surface, and then the clutch plate has to be moved slowly transmitting power to the flywheel with slip. Finally, the clutch plate is stopped to move, and the clutch is engaged completely without slip.

Therefore, it is necessary to specify the clutch stroke position at which the clutch face meets the flywheel surface and use this position as information in order to perform the automatic control in a satisfactory manner.

In this particular specification, "partially engaged clutch stroke position" means the position at which the clutch face meets the flywheel surface to start the power transmission with slip.

However, a friction clutch is subject to wear during use, and a partially engaged clutch stroke positions changes little by little.

Further, it exerts a deleterious effect on control if sensor faults and other factors cause a partially engaged clutch stroke position to become removed from the actual partially engaged clutch position.

SUMMARY OF THE INVENTION

An object of the present invention is to always specify a partially engaged clutch stroke position which changes with wearing of a friction clutch, whereby fine engagement control in partially engaged position determination is continuously enabled regardless of wearing of the clutch.

Another object of the present invention is to diagnose abnormalities in a determination process for a partially engaged clutch stroke position.

The present invention provides a method of specifying a partially engaged clutch stroke position for a friction clutch engaged and disengaged by a clutch actuator under automatic control or by driver's manual operation, comprising determining an initial partially engaged clutch stroke position and an initial clutch stroke position at which fluid pressure in the clutch actuator reaches a prescribed value, so as to obtain a difference between the initial partially engaged clutch stroke position and initial clutch stroke position attaining the prescribed fluid pressure value prior to initiation of automatic clutch control, detecting a current clutch stroke position at which the fluid pressure in the clutch actuator reaches the prescribed value while the automatic control is being performed, calculating a value by adding the difference to the detected current clutch stroke position, and using the value as a current partially engaged stroke position of the clutch in the automatic control operation.

As the fluid pressure in the clutch actuator rises, a clutch plate is moved in a disengaging direction so that it leaves from a flywheel of an engine. The initial partially engaged clutch stroke position may be determined when a vehicle is assembled in a factory. The initial clutch stroke position may also be determined immediately upon completion of vehicle assembling. The difference between the initial partially engaged clutch stroke position and initial clutch stroke position does not change in spite of wearing of the friction clutch. On the other hand, both of the partially engaged clutch stroke position and clutch stroke position attaining the predetermined fluid pressure changes with the wearing of the clutch. Therefore, by calculating the sum of the above mentioned difference and a current clutch stroke position attaining the predetermined fluid pressure value, it is possible to obtain a current partially engaged clutch stroke position.

All of the clutch stroke positions may be determined according to output voltages from a clutch stroke sensor. The predetermined value of fluid pressure may be a value which causes a clutch plate to start disengaging from a flywheel of an engine.

According to another aspect of the present invention, there is provided a method of diagnosing abnormalities in determining a partially engaged clutch stroke position of a friction clutch comprising determining an initial partially engaged clutch stroke position and an initial clutch stroke position at which fluid pressure in a clutch actuator used to disengage the friction clutch under automatic control reaches a prescribed value, so as to determine a difference between the two clutch stroke positions prior to initiation of operation of the automatic control, and determining an automatic clutch system to be abnormal when the determined difference does not fall within a predetermined range. This abnormality diagnosis may be performed before a vehicle is marketed. The initial partially engaged clutch stroke position may be determined based on an output voltage from a clutch stroke sensor. If the clutch stroke sensor malfunctions and does not provide an accurate value, the difference between the determined two clutch stroke positions may have an abnormal value.

According to still another aspect of the present invention, there is provided a method of diagnosing abnormalities in an automatic clutch control for a vehicle equipped with a friction clutch comprising the steps of sensing a partially engaged clutch stroke position, sensing a clutch stroke position at which fluid pressure in a clutch actuator used to disengage the friction clutch under automatic control reaches a prescribed value, calculating a difference between the two clutch stroke positions, and determining occurrence of abnormalities if the calculated difference does not fall within a predetermined range. This abnormality diagnosis may be performed while a vehicle is running.

BRIEF DESCRIPTION OF THE DRAWINGS

FIG. 2 illustrates an overall structural diagram depicting a vehicle fitted with an automatic clutch.

DETAILED DESCRIPTION OF THE INVENTION

Figure 1:
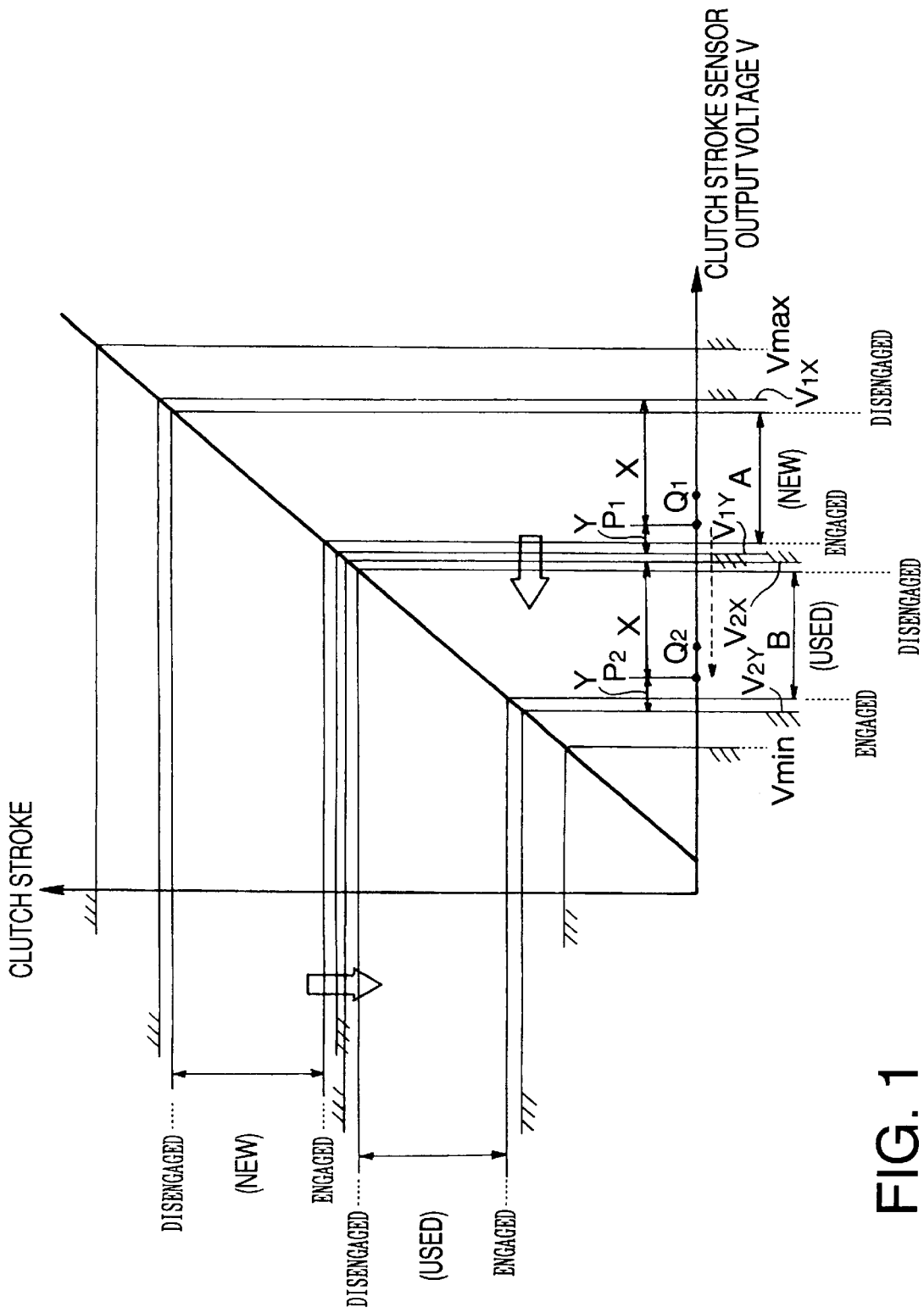
FIG. 1 is a graph illustrating the relationship between a clutch stroke and an output voltage of a clutch stroke sensor.

There follows, with reference to the drawings, a detailed description of the preferred embodiments of the present invention.

Referring to FIG. 2, illustrated is a vehicle equipped with a so-called semi-automatic clutch device. Specifically, a clutch 1 is a friction clutch, and is configured in such a manner that it may be engaged and disengaged manually with the aid of manual means of engagement and disengagement 2, or automatic means of engagement and disengagement (clutch actuator) 3. The drawing illustrates the normal state, where the clutch 1 is engaged and neither of the above means is activated.

A clutch fork 4 of the clutch 1 executes strokes in the directions of engagement and disengagement by virtue of the reciprocal movement of a slave cylinder 5 acting as a fluid pressure cylinder. The oil pressure (fluid pressure) which provides the clutch engaging/disengaging force is supplied to the slave cylinder 5 from an intermediate cylinder 6. This intermediate cylinder 6 switches between oil pressure supplied from a master cylinder 7 and oil pressure supplied from a source of oil pressure 8 (i.e., selects one of these two oil pressure), and feeds the oil pressure to the slave cylinder 5 in accordance to the selected oil pressure. The master cylinder 7 generates oil pressure in response to the degree of depression (degree of operation) of a clutch pedal 9, and feeds it to the intermediate cylinder 6. The source of oil pressure 8 includes a motor 10, an oil pressure pump 11, a check valve 32, electromagnetic valves 30, 31 and a relief valve 13. The motor 10 and the electromagnetic valves 30, 31 are driven and controlled by an electronic control unit 14 so that the supply and release of oil pressure take place in a desired manner. These elements form an oil pressure piping system, and the oil which is a working fluid is stored in an oil tank 15.

The electromagnetic valves 30, 31 are "duty" controlled by the control unit 14. In this particular embodiment, these valves are of the normal-close type, i.e., they are closed when "off". The electromagnetic valves 30, 31 are used for the purpose of engaging and disengaging the clutch 1, or for emitting oil from the slave cylinder 5. The electromagnetic valves 30, 31 have flow channels of differing diameter. The clutch engagement rate is changed successively by the way in which these electromagnetic valves 30, 31 are controlled. The relief valve 13 is a fail-safe provision which opens if the oil pressure rises abnormally, and is normally closed.

In this configuration, manual engagement and disengagement of the clutch 1 is performed in the following manner. First, as the unbroken arrows show, if the clutch pedal 9 is depressed from the state illustrated, it causes oil pressure to be generated from the master cylinder 7. This oil pressure pushes both pistons 16, 17 within the intermediate cylinder 6 in the same direction, with the result that oil pressure equivalent to the degree of depression of the pedal is supplied from the intermediate cylinder 6 to the slave cylinder 5. Accordingly, a piston 18 within the slave cylinder 5 is pushed, causing the clutch fork 4 also to be pushed, and allowing the clutch 1 to operate in the direction of disengagement by an amount which corresponds to the degree of depression of the clutch pedal 9. Releasing the clutch pedal 9 allows the oil pressure to return and the clutch 1 to operate in the direction of engagement, as is depicted by the broken arrows. The pistons 16, 17 within the intermediate cylinder 6 are pushed back with the aid of a spring 35 into their normal positions. In this way manual engagement and disengagement are achieved. Thus, the clutch pedal 9, master cylinder 7, intermediate cylinder 6 and slave cylinder 5 constitute in combination the manual means of engagement and disengagement 2.

Meanwhile, strokes of the clutch 1 or the clutch fork 4 are continuously detected by a clutch stroke sensor 19. In this embodiment, the clutch stroke sensor 19 is a potentiometer which is operatively engaged by the clutch fork 4 by way of a link 36.

As illustrated in FIG. 1, the clutch stroke sensor 19 outputs an electric voltage V which is proportional to the clutch stroke, and more specifically outputs an electric voltage the size of which increases in proportion to the degree of disengagement of the clutch. At the outlet of the intermediate cylinder 6, provided is an oil pressure switch 33, which switches from "off" to "on" if the detected oil pressure rises and reaches a set value. Signals from the sensor 19 and the switch 33 are transmitted to the control unit 14.

Referring back to FIG. 2, the above described components are provided in a vehicle having a normal manual transmission 20. The transmission 20 is engaged mechanically to means of shift operation (shift lever device) 21 with the aid of a link, wire cable or similar means, and is capable of shift position (gear position) change in line with shift lever operations. The means of shift operation 21 has a shift knob 22 which is capable of slight oscillation in relation to a knob lever 23, the oscillation causing a contact in the shift knob to engage and generate a prescribed shift position change signal. The transmission 20 is also fitted with a shift stroke sensor 34, select stroke sensor 35 and neutral switch 24, which serve to detect gear positions. Signals from these sensors and this switch are input to the control unit 14.

In this configuration, automatic engagement and disengagement of the clutch 1 are achieved in the following manner. Suppose that while the vehicle is running in a particular gear, the driver applies shift force to the shift knob 22 with the intention of changing shift position. The shift knob 22 oscillates slightly and generates a shift position change signal from the means of shift operation 21. This signal is transmitted to the control unit 14, which starts the motor 10 up. Then, as the unbroken arrows show, the oil pressure pump 11 is started up, generating oil pressure, which pushes the check valve 32 open to reach the intermediate cylinder 6. The pistons 16, 17 in the intermediate cylinder 6 are pushed in opposite directions respectively. As a result, the piston 17 on the outlet side applies further pressure to the oil on the outlet side, supplying oil pressure to the slave cylinder 5. The piston 18 within the slave cylinder 5 then pushes the clutch fork 4 and disengages the clutch 1. After that, the motor 10 stops and the oil pressure is retained by the check valve 32, keeping the clutch disengaged.

Once the clutch 1 has been disengaged, continued operation of the shift lever by the driver allows the transmission 20 to be put into the next gear.

At the same time, the control unit 14 is notified by signals from the shift stroke sensor 34 and select stroke sensor 35 that the gear position (shift position) of the transmission 20 has been changed, and it begins to engage the clutch 1. More specifically, it controls the electromagnetic valves 30, 31 in the optimum manner in accordance with engine running conditions, vehicle driving conditions and the will of the driver. Thus, as the broken arrows show, the oil pressure is released from the slave cylinder 5, the clutch fork 4 is returned, and the clutch 1 is engaged at the optimum speed. In this manner, the control unit 14, source of oil pressure 8, intermediate cylinder 6 and slave cylinder 5 constitute in combination the automatic means of engagement and disengagement (clutch actuator) 3.

The driver can switch between manual and automatic clutch engagement/disengagement modes with the aid of a switch 25 which is provided inside the vehicle compartment.

In this embodiment, the clutch 1 is engaged and disengaged by the feedback control while observing the actual clutch strokes detected by the clutch stroke sensor 19. In order to ensure that the clutch 1 can be controlled correctly, as shown in FIG. 1, the maximum and minimum limit voltages Vmax, Vmin at which the clutch 1 clearly diverges from the permitted stroke range are stored in the memory. The clutch stroke sensor 19 is judged to be abnormal if the output voltage V exceeds Vmax or drops below Vmin.

It should be noted here that a proper usage range for the clutch 1 changes according to how much the clutch 1 is worn since the friction clutch is used in this embodiment.

As illustrated in FIG. 1, the proper usage range is the comparatively high-voltage area A when the clutch 1 is new. The proper voltage range for the clutch stroke sensor 19 decreases little by little as wear on the clutch 1 progresses. For instance, the area A is shifted to the area B as illustrated in the drawing.

In order to include all these shifting proper ranges, the maximum and minimum limit voltages Vmax, Vmin are set at values divorced from a current proper range in some instances. For example, the lower limit for the range A is far from the lower limit Vmin for abnormality determination.

This means that it is not always possible to give a diagnosis of abnormality against a slight-degree of divergence, leading to the inconvenience mentioned above and detracting from its reliability. Moreover, rapid diagnosis of sensor abnormalities is not always feasible because of the unavoidable delay in sensor output voltage reaching the maximum and minimum limit voltages Vmax, Vmin.

In these circumstances it is desirable that the current proper range be taken, and values slightly higher and lower than this range be set as temporary upper and lower limits to determine whether or not abnormalities are occurring. Fixed upper and lower limits do not improve accuracy and promptness (quick determination) of control because the proper range for usage of the sensor changes according to the degree of clutch wear.

In the present invention, therefore, a shiftable reference value, which changes as the clutch wears, is determined (will be described later), and the upper and lower limits for abnormality checking are determined by means of particular differences from this reference value. Diagnosis of clutch stroke sensor abnormalities corresponding to the degree of wear are thus realized.

To be more precise, the clutch stroke sensor output voltage V at which the oil pressure switch 33 is activated when the clutch stroke sensor 19 is normal is programmed into the control unit 14 as the reference value ($P_1$, $P_2$ in FIG. 1). The control unit 14 then calculates the temporary abnormal values on the disengaging side ($V_{1X}$, $V_{2X}$ in FIG. 1) and on the engaging side ($V_{1Y}$, $V_{2Y}$ in FIG. 1) by adding and subtracting the two different values (X, Y in FIG. 1) to and from the reference value. The clutch stroke sensor 19 is judged to be abnormal if its output voltage V attains these upper and lower limit values ($V_{1X}$, $V_{2X}$ and $V_{1Y}$, $V_{2Y}$).

The activation point of the oil pressure switch 33 (the pressure at which the oil pressure switch 33 turns on) is set to a value of when the clutch fork 4 is about to move for clutch disconnection as the outlet pressure of the intermediate cylinder 6 (the internal pressure of the slave cylinder 5) is raised slightly from the clutch engaged condition. This corresponds to a play. Clutch wear causes the position of the clutch fork 4 when the clutch is engaged to diverge towards the engagement side, as the imaginary lines in FIG. 2 illustrate, and the range of use of the sensor 19 also diverges. On the other hand, the activation point (pressure value) of the oil pressure switch 33 is constant irrespective of clutch wear. This nature can be utilized: the sensor output at the oil switch activation point is taken as a criterion to demonstrate clutch wear. By determining abnormal levels on the engagement and disengagement sides in accordance with this, it is possible to diagnose clutch stroke sensor abnormalities in a suitable manner without regard to clutch wear.

It goes without saying that the above mentioned values X, Y are set so that when added to or subtracted from the reference values $P_1$, $P_2$ they exceed slightly the values for the clutch engagement or disengagement positions. Thus, once the reference values $_P1$, $P_2$ are known, abnormal levels close to the current range of use of the sensor are determined automatically, and use of the sensor is prohibited outside the range of these abnormal levels.

In this manner it is possible to shift the abnormal values on the engaging and disengaging directions in accordance with clutch wear. Thus it is feasible to diagnose abnormalities in the sensor 19 appropriately, which diagnosis would be impossible if the fixed uppermost and lowermost limit values Vmax, Vmin were only utilized. (For instance, a value slightly smaller than the value $V_{1Y}$ is determined to be abnormal in the invention, but not in the conventional apparatus.) This allows abnormalities to be diagnosed at an early stage, thereby increasing reliability.

It is possible to diagnose abnormalities of the sensor 19 by the temporary abnormal levels ($V_{1X}$, $V_{2X}$, $V_{1Y}$, $V_{2Y}$) only, but back-up is promised by further using the fixed limit values Vmax, Vmin. Moreover, the point of activation of the oil pressure switch 33 can also be employed elsewhere, as in the specification of and diagnosis of abnormalities in partially engaged clutch stroke positions ($Q_1$, $Q_2$ in FIG. 1; will be describe below), thus contributing to lower costs.

There now follows a description of the method of specifying and diagnosing abnormalities in partially engaged clutch stroke positions.

To begin with, the following is the method which is used to specify a clutch stroke position in the partially engaged position of the clutch 1 (partially engaged clutch stroke position) when the clutch 1 is new, namely when the vehicle has just come off the factory line or immediately after the clutch has been replaced or otherwise renewed.

Firstly, the partially engaged clutch stroke position is set according to the so-called second learning method. The vehicle's parking brake is engaged and the vehicle brought to a standstill. The engine is kept in an idling condition. The clutch 1 is then engaged gradually automatically from the disengaged position. When the clutch attains a partially engaged position, the revolution speed of the engine drops a little. At this point, the control unit 14 learns the clutch stroke sensor output voltage V as the initial or actual partially engaged clutch stroke position $Q_1$.

Then, the control unit 14 learns the reference level $P_1$ when the oil pressure switch 33 first turns on (manually or automatically).

Next, the control unit 14 determines the difference $R_1$ (=$Q_1-P_1$) by subtracting the reference value $P_1$ from the partially engaged clutch stroke level $Q_1$. If this difference $R_1$ is within the range of the set values $K_H$, $K_L$ ($K_H > K_L$) which have been stored in the memory in advance, i.e., if $K_H > R_1 > K_L$ pertains, the control unit 14 judges the partially engaged clutch stroke position $Q_1$ to be normal and in turn the semi-automatic clutch system to be normal. It should be noted that when the clutch is new the set values are determined so that $Q_1$ be outside the range.

As the vehicle runs, the clutch 1 becomes subject to wear, as a result of which the partially engaged clutch stroke position also changes. Now it becomes impossible to use the previous value $Q_1$, and so the partially engaged clutch stroke position is renewed in the following manner. As, has already been pointed out, the reference value changes in line with wear to the clutch 1, and consequently a new partially engaged clutch stroke value $Q_2$ is determined by adding the difference $R_1$ to a new reference value, e.g., $P_2$ in the range B in FIG. 1. Again, the control unit 14 learns this. In this manner it is possible to specify the current partially engaged clutch position in accordance with clutch wear.

Here also abnormalities are diagnosed as described above. The difference $R_2$ between the new partially engaged clutch stroke position $Q_2$ and the new reference level $P_2$ is determined and diagnosed to establish whether or not the condition $K_H > R_2 > K_L$ is satisfied. If this condition is met, the partially engaged clutch stroke level $Q_2$ is judged to be normal.

However, it can happen, for instance, that the oil pressure switch 33 or the clutch stroke sensor 19 malfunctions, or that the fitting is loose or there is noise, as a result of which an wrong reference level $P_2$ or difference $R_1$ is generated, and $K_H > R_2 > K_L$ does not pertain. At such times, the control unit 14 judges the calculated partially engaged clutch stroke level $Q_2$ to be abnormal, and does not learn it.

Consequently, when an abnormal partially engaged clutch stroke level $Q_2$ is calculated, that value is not used, and it is possible for clutch engagement control to be implemented on the basis of the previous value. This serves to prevent control failure, greatly improving controllability and reliability.

Because a new reference value is generated with each clutch engagement, it is possible to specify and diagnose abnormalities in partially engaged clutch stroke positions on each occasion. However, in order to simplify the control it may also be satisfactory to implement it only each time a plurality of new reference values has been generated, or when the reference value has been altered to a different value.

The above is a description of the embodiment of the present invention, and the present invention is not limited to the illustrated and described embodiment. For example, the fluid pressure need not be oil pressure. The present embodiment has been described as applied to a semi-automatic clutch device, but the invention may also be applied to a fully automatic clutch device, or if necessary to a manual clutch device. In the case of a manual clutch device the reference values may also be determined in accordance with master cylinder pressure.

This application claims priority of Japanese Patent Application No. 10-48396 filed Feb. 27, 1998, and the entire disclosure thereof is incorporated herein by reference.

What is claimed is:

1. A method for automatic control of a clutch (1) in a vehicle, the clutch being designed to be disengaged and engaged by a clutch actuator (3) under automatic control, comprising of:
   determining an actual partially engaged clutch stroke position (Q1) and an initial clutch stroke position (P1) at which fluid pressure in a clutch actuator reaches a prescribed level, thereby obtaining a difference (R1) between said two clutch stroke positions prior to initiation of operation of automatic clutch control;
   detecting a clutch stroke position (P2) at which the fluid pressure in the clutch actuator reaches the prescribed level while the automatic control is operating;
   calculating a value by adding the difference (R1) to the detected clutch stroke position (P2); and
   using the value as a current partially engaged stroke position (Q2) of the clutch in the automatic control operation.

2. The method of claim 1, wherein each of the clutch stroke positions (Q1, P1, P2) is an output voltage value (V) of a clutch stroke sensor (19).

3. The method of claim 1, wherein the prescribed level is fluid pressure which causes a clutch plate to start disengaging from a flywheel of an engine.

4. The method of claim 1, wherein the clutch is a friction clutch engaged and disengaged by the clutch actuator (3) under automatic control or by a driver's manual operation.

5. The method of claim 1, wherein the automatic clutch engagement and disengagement is performed by:
   a master cylinder (7) for generating first fluid pressure according to movement of a clutch pedal (9);
   a fluid pressure pump (11) and electromagnetic valve (30, 31) for generating second fluid pressure according to a shift position change signal produced upon operating of a shift lever (21);
   a first cylinder (6) for generating third fluid pressure according to the first or second fluid pressure; and
   a second cylinder (5) for moving a clutch fork (4) of a friction clutch (1) according to the third fluid pressure, and the fluid pressure which causes a force needed to move a friction clutch (1) is the third fluid pressure.

6. An apparatus for automatic control of a clutch (1) in a vehicle, the clutch being designed to be disengaged and engaged by a clutch actuator (3) under automatic control, comprising:
   means for determining an actual partially engaged clutch stroke position (Q1) and an initial clutch stroke position (P1) at which fluid pressure in a clutch actuator reaches a prescribed level, thereby obtaining a difference (R1) between said two clutch stroke positions prior to initiation of operation of clutch automatic control;
   means for detecting a clutch stroke position (P2) at which the fluid pressure in the clutch actuator reaches the prescribed level while the automatic control is being performed;
   means for calculating a value by adding the difference (R1) to the detected clutch stroke position (P2); and
   means for using the value as a current partially engaged stroke position (Q2) of the clutch in the automatic control operation.

7. The apparatus of claim 6, wherein each of the clutch stroke positions (Q1, P1, P2) is an output voltage value (V) of a clutch stroke sensor (19).

8. The apparatus of claim 6, wherein the prescribed level is fluid pressure which causes a clutch plate to start disengaging from a flywheel of an engine.

9. The apparatus of claim 6, wherein the clutch is a friction clutch engaged and disengaged by the clutch actuator (3) under automatic control or by a driver's manual operation.

10. The apparatus of claim 6 further including:
    a master cylinder (7) for generating first fluid pressure according to movement of a clutch pedal (9);
    a fluid pressure pump (11) and electromagnetic valve (30, 31) for generating second fluid pressure according to a shift position change signal produced upon operating of a shift lever (21);
    a first cylinder (6) for generating third fluid pressure according to the first or second fluid pressure; and
    a second cylinder (5) for moving a clutch fork (4) of a friction clutch (1) according to the third fluid pressure, and the fluid pressure which causes a force needed to move a friction clutch (1) is the third fluid pressure.

* * * * *